(12) United States Patent
Zeuner et al.

(10) Patent No.: US 8,087,620 B2
(45) Date of Patent: Jan. 3, 2012

(54) RETAINING DEVICE

(75) Inventors: Lutz Zeuner, Hardebek (DE);
Hans-Peter Guthke, Buxtehude (DE)

(73) Assignee: Airbus Deutschland GmbH (DE)

( * ) Notice: Subject to any disclaimer, the term of this patent is extended or adjusted under 35 U.S.C. 154(b) by 371 days.

(21) Appl. No.: 11/992,174

(22) PCT Filed: Sep. 19, 2006

(86) PCT No.: PCT/EP2006/009093
§ 371 (c)(1),
(2), (4) Date: Sep. 15, 2009

(87) PCT Pub. No.: WO2007/039095
PCT Pub. Date: Apr. 12, 2007

(65) Prior Publication Data
US 2010/0001135 A1    Jan. 7, 2010

Related U.S. Application Data

(60) Provisional application No. 60/720,624, filed on Sep. 26, 2005.

(30) Foreign Application Priority Data

Sep. 26, 2005   (DE) .......................... 10 2005 045 846

(51) Int. Cl.
*F16L 3/08* (2006.01)

(52) U.S. Cl. .............. 248/65; 248/49; 248/58; 248/68.1

(58) Field of Classification Search .................... 248/65, 248/49, 58, 68.1
See application file for complete search history.

(56) References Cited

U.S. PATENT DOCUMENTS

| 5,301,475 A | * | 4/1994 | Stefely ................................ 52/1 |
| 7,419,124 B2 | * | 9/2008 | Zeuner et al. ................ 248/68.1 |
| 2007/0164160 A1 | | 7/2007 | Guillois et al. |

FOREIGN PATENT DOCUMENTS

| DE | 20 2005 007 476 U1 | | 8/2005 |
| DE | 103 58 978 A1 | | 8/2005 |
| EP | 0 060 567 A1 | | 3/1982 |
| FR | 2 863 587 A1 | | 6/2005 |
| GB | 972995 | | 10/1964 |
| GB | 2 378 746 | * | 7/2002 |
| JP | 07-027119 A | | 1/1995 |
| SU | 1274047 A1 | | 11/1986 |
| SU | 1510035 A2 | | 9/1989 |

OTHER PUBLICATIONS

International Search Report issued on Jan. 26, 2007 in connection with corresponding International Application No. PCT/EP2006/009093.

* cited by examiner

*Primary Examiner* — Amy J Sterling
(74) *Attorney, Agent, or Firm* — Lerner, David, Littenberg, Krumholz & Mentlik, LLP

(57) ABSTRACT

A retaining device includes a fireproof core enclosed by a non-fireproof case, wherein a pre-tensioned fireproof device is integrated in the case and attached to the core. The fireproof device relaxes in such a way, when the case melts, that a construction element is reliably held between the carrier and the device.

15 Claims, 3 Drawing Sheets

RETAINING DEVICE

REFERENCE TO RELATED APPLICATIONS

Figure 1:
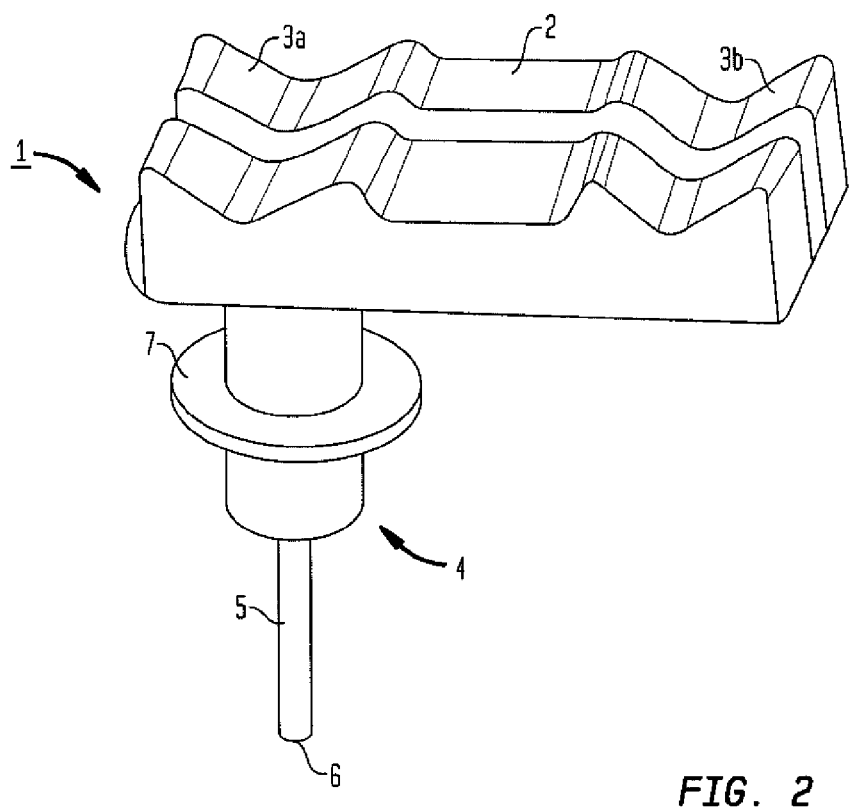

This application claims the benefit of the filing date of German Patent Application No. 10 2005 045 846.7 filed Sep. 26, 2005 and of U.S. Provisional Patent Application No. 60/720,624 filed Sep. 26, 2005, the disclosure of which applications is hereby incorporated herein by reference.

The invention relates to a retaining device, in particular to a combined retainer for use in aircraft.

In aircraft, cable retainers are used for retaining and guiding electrical line routes in various regions. Preferably, cable retainers made of plastic are used, due to their light intrinsic weight. The retainers are matched to the concrete connection conditions on the transverse support or frame element, for example to the thickness of the web of the transverse support, to the borehole diameter, etc.

A conventional retainer comprises plastic and is designed as a screw-and-nut connection. It is used to retain or guide groups of electrical lines along the transverse support or the frame element. Along the frame element a conventional retainer is in particular used for guiding rising and descending routes and for holding an insulating mat. However, in the case of excessive heat, for example exposure to fire, the plastic of the above-mentioned conventional retainer that holds the insulating mat around the frame element melts, and the insulating mat falls down over the nut-and-screw connection.

It is the object of the present invention to create a retainer that even with the effect of fire can reliably hold, for example, an insulating mat placed around the frame element.

The solution to this object is stated in claim 1. Advantageous improvements of the invention are stated in the subordinate claims.

The retaining device according to the invention comprises a fireproof core, for example made of metal, which is enclosed by a case that is not fireproof. The case is, for example, made of plastic and is moulded around the metal core by means of a conventional injection moulding method. One end of the core of the retaining device can, for example, be attached to a carrier or frame element. In the case a pre-tensioned fireproof device is integrated and attached to the core. The pre-tensioned fireproof device relaxes when the case melts, as a result of which a construction element (for example an insulating mat) that has been placed around the carrier can reliably be held between the carrier and the relaxed device.

According to an improvement of the invention the case comprises a non-fireproof flange region in which the device is integrated. The construction element is reliably held between the carrier and the flange when the device is in its pre-tensioned state, and the construction element is reliably held between the carrier and the relaxed device when the device is in its relaxed state.

According to an advantageous embodiment of the device it comprises at least one spring element which in its relaxed state radially extends from the core towards the outside.

As an alternative the device can be a spiral spring through which the core extends, and which in its relaxed state relaxes in the direction of the carrier, as a result of which the construction element is pushed in the direction of the carrier, and any sliding down of the construction element is prevented.

According to a further development of the invention, at the end of the case, which end faces away from the carrier, there is a holding device to retain lines, for example electrical lines or other pipelines. The holding device and the case are for example made in a single piece from plastic with the use of an injection moulding method.

The core of the retaining device is, for example, a metal pin. As an alternative the core can be a screw which extends through a borehole formed in the carrier. According to this embodiment the screw can be screwed in at the other side of the carrier with the use of a nut component, as a result of which the retaining device can be attached to the carrier.

According to the invention, the nut component is preferably a fireproof nut (for example made of metal), which nut is enclosed by a non-fireproof casing. The non-fireproof casing is, for example, made from the same material as the case of the holding device. In a similar manner a pre-tensioned fireproof tension device is integrated in the casing and is attached to the nut so as to relax in such a way, when the casing melts, that the construction element, for example the insulating mat, is reliably held between the carrier and the tension device.

The tension device is designed in a manner that is equivalent to the above-mentioned device that is attached by means of the screw.

According to a preferred improvement of the invention the casing of the nut component comprises a non-fireproof flange in which the tension device is preferably integrated. In this arrangement the construction element is reliably held between the carrier and the flange when the tension device is in its pre-tensioned state, and the construction element is reliably held between the carrier and the tension device when the tension device is in its relaxed state.

According to an improvement the tension device comprises at least one spring element which in its relaxed state radially extends from the nut towards the outside, in a manner similar to that of the above-mentioned device of the retaining device, which extends radially outward from the screw.

As an alternative the tension device can be a spiral spring which in the relaxed state relaxes from the nut in the direction of the carrier, similar to the device that in the relaxed state relaxes from the screw in the direction of the carrier.

According to yet another improvement of the invention the casing end that points away from the carrier is designed as a retainer to hold lines. The retainer is, for example, constructed in a manner similar to the above-mentioned holding device for holding and guiding electrical lines and pipes.

The retainer and/or the casing are, for example, injection moulded from a plastic material. The retainer and the casing can be designed so as to be integrated in each other.

Figure 2:
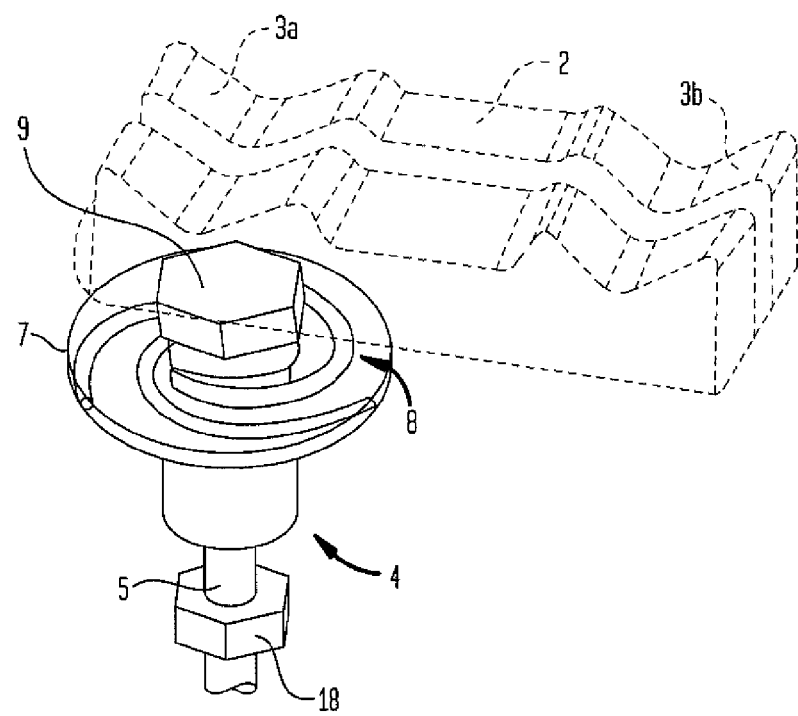
Figure 3:
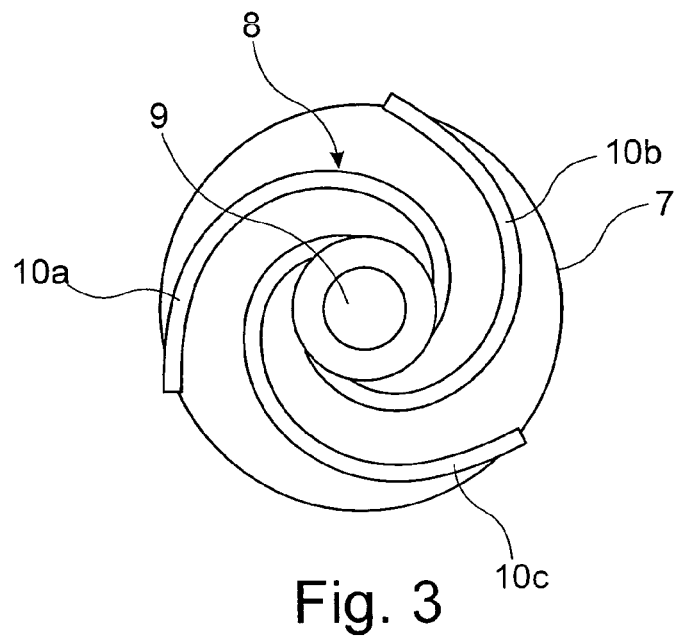
Figure 4:
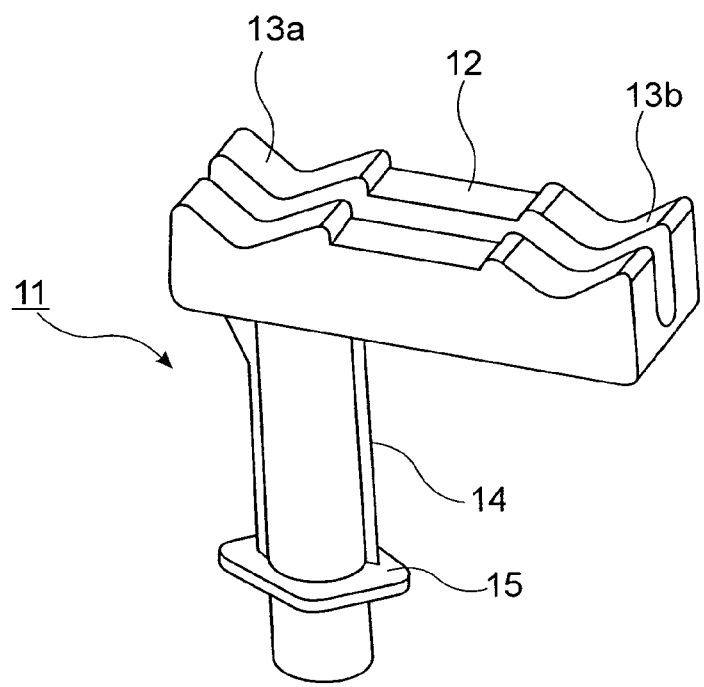
Figure 5:
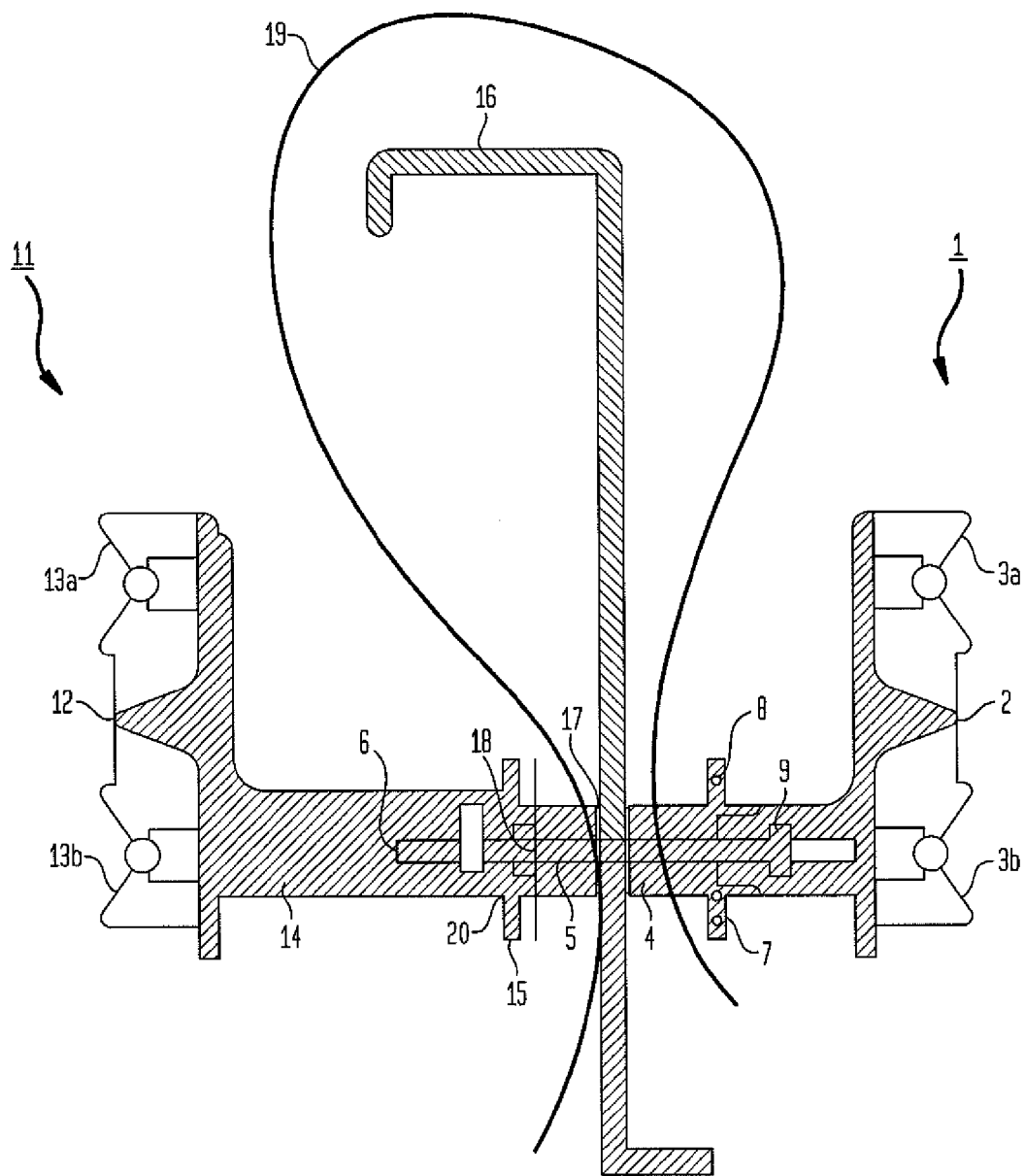

Below, preferred exemplary embodiments of the invention are described with reference to the enclosed drawings. The following are shown:

FIG. 1 a perspective view of a retaining device according to one exemplary embodiment of the invention, obliquely from above;

FIG. 2 a perspective view of the retaining device according to FIG. 1, showing the interior of the retaining device;

FIG. 3 a top view of the device shown in FIG. 2 in a tensioned state;

FIG. 4 a nut component according to one exemplary embodiment, which nut component can be screwed to the retaining device shown in FIG. 1; and FIG. 5 a diagrammatic view in which the retaining device shown in FIG. 1 is screwed to the nut component shown in FIG. 4 and is attached to a frame element.

Below, for identical components the same reference signs have been used in the different views in the figures.

FIG. 1 shows a perspective view of a retaining device 1 according to a preferred exemplary embodiment of the invention, obliquely from above. The retaining device 1 comprises a retainer 2 for retaining lines, for example for retaining electrical looms of cables. As shown in FIG. 1, a retaining surface of the retainer 2 comprises corresponding recesses in margin regions 3a, 3b so that an electrical line can be placed in said retaining surface. In FIG. 1 the electrical lines are not shown. The retaining surface of the retainer 2 can be adapted accordingly to various fields of application.

As shown in FIG. 1 a component 4 extends essentially perpendicularly away from the retainer 2. The component 4 can also extend away from the retainer 2 at some other angle.

The retainer 2 and the component 4 are, for example, made of one plastic material and are injection moulded in one piece. As an alternative, the retainer 2 and the component 4 can be separate components, wherein the retainer 2 can be clipped onto the component 4.

As shown in FIG. 1 the component 4 retains a screw 5 made of metal in a positive-locking manner. The screw 5 can also be made from some other suitable fire-resistant material.

As an alternative the screw 5 can be replaced by a metallic bolt without a thread, or by a pin. In this case the free end 6 of the rod or screw 5 is, for example, welded to a carrier or frame element (not shown) or is otherwise attached to said carrier or frame element. In the case of a screw, the screw 5 reaches, for example, through a through hole (not shown) formed in the frame element or carrier and is screwed from the other side of the frame element or carrier by means of a metal screw.

As shown in FIG. 1 the component 4 further comprises a flange 7. The flange 7 is preferably integrated with the component 4 and is injection moulded from a plastic material. The flange 7 is described in more detail with reference to FIG. 2.

FIG. 2 shows a perspective view of the retaining device according to FIG. 1, which clarifies the interior of the flange 7.

According to the preferred exemplary embodiment a pre-tensioned device 8 is moulded in the flange 7. As shown in FIG. 2 the device 8 is affixed to the head 9 of the screw 5. As an alternative the device 8 can be fixed to any desired position by means of the screw 5. In particular it is possible to also integrate the device 8 in the component 4 in a pre-tensioned state.

FIG. 3 shows a top view of the pre-tensioned device 8 shown in FIG. 2. As shown in FIG. 3, according to one exemplary embodiment of the invention, the device 8 comprises three elastic spring elements 10a-c, which in the pre-tensioned state partly extend around the screw 5.

If for example due to the effect of fire the plastic flange 7, in which the device 8 is integrated, melts, the spring elements 10a-c spring outward and essentially project radially outward away from the screw 5.

As an alternative the device 8 can be designed as a fireproof spiral spring, which is, for example, affixed to the head region 9 of the screw 5. The screw 5 can, for example, extend through the spiral spring, wherein the spiral spring extends along the screw 5 when the flange 7 melts.

FIG. 4 shows a nut component 11 according to one exemplary embodiment of the invention, which nut component 11 can be screwed to the retaining device shown in FIG. 1. In a way that is similar to the retaining device according to FIG. 1, the nut component 11 comprises a retainer 12. The retainer 12 is designed in a way that is similar to the retainer 2 of the retaining device 1, and in margin regions 13a, b also comprises recesses in order to support looms of cables or pipelines. A component 14 extends from the retainer 12 so as to be essentially perpendicular.

The component 14 and the retainer 12 are preferably made from a plastic material and are, for example, injection-moulded in one piece. As an alternative, the component 14 and the retainer 12 can be separate parts, wherein the retainer 12 can be clipped onto the component 14.

As shown in FIG. 4, the component 14 comprises a flange 15 which is injection moulded, preferably so as to be integrated with the component 14.

According to a preferred embodiment of the nut component, a nut (not shown) is moulded in the component 14 (or in the flange 15). The nut is preferably made of metal or of some other suitable fireproof material.

In a manner similar to that of the device 8, the component 14 comprises a tension device (not shown) that is described in more detail with reference to FIG. 5.

FIG. 5 shows a section view in which the retaining device 1 shown in FIG. 1 is screwed to the nut component shown in FIG. 4 and is attached to a frame element 16.

In FIG. 5 the nut component 11 is on the left-hand side of the frame element 16, and the retaining device according to FIG. 1 is on the side opposite the frame element 16, on the right-hand side in FIG. 5.

As shown in FIG. 5, the frame element 16 comprises a through-hole 17 through which the screw 5 is inserted from the right-hand side in the figure. The nut component 11 is then screwed onto the screw 5 by means of the nut 18 integrated in the component 14.

In the attached state, for example the respective surfaces of the components 4, 14 of the retaining device 1 and of the nut component 11 contact facing surfaces of the frame element 16 as shown in FIG. 5.

As shown in FIG. 5, a construction element 19, for example an insulating mat, is placed around the frame element 16, through which insulating mat the components 4, 14 of the retaining device 1 and the nut component 11 extend. The flanges 7, 15 prevent the insulating mat 19 from sliding from the retaining device 1 or from the nut component 11.

In the normal operating state (without exposure to fire) the insulating mat 19 is reliably held to the frame element 16 by the flanges 7, 15 of the retaining device 1 or of the nut component 11, wherein the aforesaid prevent the insulating mat 19 from sliding from the retaining device 1 or from the nut component 11.

When exposed to fire the plastic components melt, wherein the above-mentioned device 8 relaxes and assumes the function of the flange 7, as a result of which any sliding down of the insulating mat 19 from the retaining device 1 is prevented.

In a manner similar to that of the device 8 in the retaining device 1, the nut 18 of the nut component 11 comprises a tension device 20. The tension device 20 is designed in a manner that is identical to the manner described above with reference to the device 8, thus when exposed to fire it assumes the function of the flange 15 of the nut component 11, as a result of which any sliding down of the insulating mat 19 from the nut component 11 is prevented.

Although, above, the invention has been described with reference to preferred exemplary embodiments, modifications and alterations can of course be made also without leaving the protective scope of the invention as long as a fireproof pre-tensioned device that has been attached to a fireproof core is integrated in a pre-tensioned manner in a non-fireproof material so as to assume a relaxed state when the material melts.

Furthermore, the invention can be used not only in the aircraft sector but wherever the same problem exists, for example with ships or other vehicles.

LIST OF REFERENCE CHARACTERS

1 Retaining device
2 Retainer 3a, b Margin regions
4 Component
5 Screw
6 Free end
7 Flange
8 Device
9 Head
10a-c Spring element
11 Nut component
12 Retainer
13a, b Margin regions
14 Component
15 Flange
16 Frame element
17 Borehole
18 Nut
19 Insulating mat
20 Tension device

The invention claimed is:

1. A retaining device comprising:
a fireproof core by way of which the retaining device can be connected to a carrier, wherein said core is enclosed by a non-fireproof case, wherein a pre-tensioned fireproof device is integrated in the case and attached to the core and which the fireproof device relaxes in such a way, when the case melts, that a construction element is reliably held between the carrier and the relaxed device.

2. The retaining device of claim 1, wherein the case comprises a non-fireproof flange in which the fireproof device is integrated, and the construction element is reliably held between the carrier and the flange when the device is in its pre-tensioned state, and the construction element is reliably held between the carrier and the fireproof device when the fireproof device is in its relaxed state.

3. The retaining device of claim 1, wherein the fireproof device comprises at least one spring element which in its relaxed state radially extends from the core towards the outside.

4. The retaining device of claim 1, wherein the fireproof device comprises a spiral spring through which the core extends, and which in its relaxed state relaxes in the direction of the carrier.

5. The retaining device of claim 1, wherein at the end facing away from the carrier there is a holding device to retain lines.

6. The retaining device of claim 5, wherein the holding device and the case are integrated in each other.

7. The retaining device of claim 1, wherein the holding device and/or the case are injection molded from a plastic material.

8. The retaining device of claim 1, wherein the core comprises a screw which extends through a borehole in the carrier, and on the other side of the carrier can be screwed to a nut component to attach the retaining device to the carrier.

9. The retaining device of claim 8, further comprising the nut component, wherein the nut component comprises a fireproof nut that is enclosed by a non-fireproof casing and can be screwed by the screw, wherein a pre-tensioned fireproof tension device is integrated in the casing and is attached to the nut so as to relax in such a way that, when the casing melts, the construction element is reliably held between the carrier and the relaxed tension device.

10. The retaining device of claim 9, wherein the casing comprises a non-fireproof flange in which the tension device is integrated, and the construction element is reliably held between the carrier and the flange when the tension device is in its pre-tensioned state, and the construction element is reliably held between the carrier and the tension device when the tension device is in its relaxed state.

11. The retaining device of claim 9, wherein the tension device comprises at least one spring element which in its relaxed state radially extends from the nut towards the outside.

12. The retaining device of claim 9, wherein the tension device comprises a spiral spring which in its relaxed state relaxes from the nut in the direction of the carrier.

13. The retaining device of claim 9, wherein the end of the casing, which end faces away from the carrier, comprises a retainer designed to retain lines.

14. The retaining device of claim 13, wherein the retainer and the casing are integrated in each other.

15. The retaining device of claim 13, wherein the retainer and/or the casing are injection moulded from a plastic material.

* * * * *